United States Patent
Arima

(10) Patent No.: US 6,657,973 B1
(45) Date of Patent: *Dec. 2, 2003

(54) COMMUNICATIONS NODE, NETWORK SYSTEM AND METHOD OF CONTROLLING NETWORK SYSTEM

(75) Inventor: Yukio Arima, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/426,324

(22) Filed: Oct. 25, 1999

(30) Foreign Application Priority Data

Oct. 27, 1998 (JP) ............................................ 10-304858

(51) Int. Cl.[7] .............................................. H04L 12/28
(52) U.S. Cl. ...................... 370/254; 370/408; 370/447; 370/450; 370/461; 710/240; 710/220; 709/252; 709/227
(58) Field of Search ................................ 370/254, 255, 370/256, 257, 400, 401, 402, 407, 408, 422, 423, 447, 450, 461, 462; 713/323, 324, 320; 709/227, 225, 251, 252; 710/220, 240, 241, 242, 244, 113, 119, 309

(56) References Cited

U.S. PATENT DOCUMENTS

| | | | | |
|---|---|---|---|---|
| 5,485,458 A | | 1/1996 | Oprescu et al. ............ | 370/85.2 |
| 5,630,173 A | * | 5/1997 | Oprescu ....................... | 710/40 |
| 5,784,648 A | * | 7/1998 | Duckwall ..................... | 710/40 |
| 5,996,083 A | * | 11/1999 | Gupta et al. ................. | 713/322 |
| 6,131,167 A | * | 10/2000 | Cruz ............................ | 713/320 |
| 6,346,873 B1 | * | 2/2002 | Suzuki et al. ............... | 340/3.41 |
| 6,366,143 B1 | * | 4/2002 | Liu et al. ..................... | 327/142 |

FOREIGN PATENT DOCUMENTS

| | | | | |
|---|---|---|---|---|
| JP | 63246054 A | 10/1988 | ............ | H04L/11/00 |
| JP | 06-350652 | 12/1994 | ............ | H04L/11/20 |
| JP | 11-252147 A | 9/1999 | ............ | H04L/12/44 |
| JP | 2000165417 A | 6/2000 | ............ | H04L/12/40 |

* cited by examiner

*Primary Examiner*—Douglas Olms
*Assistant Examiner*—Tri H. Phan
(74) *Attorney, Agent, or Firm*—Harness, Dickey & Pierce, P.L.C.

(57) ABSTRACT

In a computer network including plural communications nodes connected through buses, the bus use efficiency in data transfer is improved. A root node having received a transmitted data from a first node repeats the received data to a port connected with a second node corresponding to a destination of the data, and outputs, to other ports, an NW signal indicating that a data is being transferred. A third node having received the NW signal at its root port sets a fourth node having a function as a root node as a local root node, so as to form a local network capable of independent data transfer therein. In this local network, data transfer is executed between other nodes. Through this control, plural data transfer can be executed in parallel in point of time.

12 Claims, 15 Drawing Sheets

COMMUNICATIONS NODE, NETWORK SYSTEM AND METHOD OF CONTROLLING NETWORK SYSTEM

BACKGROUND OF THE INVENTION

The present invention relates to a computer network system and communications nodes constituting the computer network system, and more particularly, it relates to a technique to conduct efficient communications in a network system of channel-type interconnection.

In a computer system, a network connected through cables or the like is generally formed so that data can be transferred among individual components. A network system is realized by interconnecting communications nodes of the respective components through buses. Since a bus for connecting the communication nodes has a single channel, plural communications nodes cannot simultaneously communicate with one another. Therefore, in order to efficiently conduct communications in a network system, the respective communications nodes are required to use buses in accordance with predetermined protocol.

An example of such protocols is IEEE 1394 "Standard for a High Performance Serial Bus". In this protocol, in transmitting a signal to a bus, a communications node attempts to gain bus access permission by conducting arbitration. The arbitrations of communications nodes are mediated by a route node singly existing in the network system, and bus access permission is given to merely one communications node among those having conducted the arbitration. The other communications nodes that have conducted the arbitration but cannot gain the bus access permission should wait for a next chance of arbitration so as to conduct arbitration again. This guarantees that merely one communications node transmits a signal to a bus.

The bus architecture is always initialized when power is turned on or when the configuration of the network is changed due to addition or deletion of communications nodes, and is uniquely determined in accordance with connection states and requests from hosts and other communications nodes so as to be kept without change until next initialization. In other words, determination of the bus architecture means determination of node numbers of communications nodes and their attributes whether or not they are a root node.

Next, data communication will be described. A communications node that has gained bus access permission starts to send a data. A communications node that has received the data checks the destination of the received data. When the communications node itself is the destination, it fetches the data, and when not, it repeats the data to a port other than the port having received the data.

FIG. 16 is a diagram for showing data transfer in a conventional network system. In FIG. 16 each circle corresponds to a communications node and a numerical value within each circle indicates a node number of the communication nodes. Also, a line connecting the circles indicates a bus between the communications nodes. FIG. 16 shows data communications for sending a data from a node 3 to a node 4. The node 3 sends the data to a node 8, and the node 8 repeats the received data to nodes 2, 4 and 7 connected thereto.

Similarly, the node 2 repeats the received data to nodes 0 and 1 connected thereto, and the node 7 repeats the received data to nodes 5 and 6 connected thereto. The node 4 recognizes that the node 4 itself is the destination of the received data and fetches the received data. In this manner, the data is transferred through all the communications nodes.

As is shown in FIG. 16, when one communications node conducts data transfer in the conventional network system, all the other communications nodes repeat the data. Therefore, communications nodes not concerned in the data transfer should repeat the received data to the other communications nodes, and hence, it is necessary to wait for the completion of the data transfer before executing arbitration. Accordingly, the conventional network system is disadvantageously poor in the use efficiency. In the conventional technique, the waiting time of a network user is apparently reduced by sharing data transfer by time.

SUMMARY OF THE INVENTION

An object of the invention is, in a network system including a plurality of communications nodes connected through buses, improving the use efficiency of the buses in data transfer.

Specifically, the communications node of this invention is included in a network system, comprises a plurality of ports; means for repeating, in receiving a data, the received data to a port among the ports capable of data transfer to a destination communications node of the data; and means for outputting, in receiving the data, to other ports thereof, an NW (now working) signal indicating that a data is being transferred, and in receiving an NW signal at a root port thereof, the communications node operates to form a local network capable of independent data transfer therein together with other communications nodes to which data is transferable from the ports thereof other than the root port.

According to the communications node of this invention, when a data is received, the communications node repeats the received data to merely a port capable of transferring the data to a destination node. To the other ports, the communications node outputs an NW signal indicating that the data is being transferred. Furthermore, when the communications node receives an NW signal at its root port, a local network capable of independent data transfer therein is formed by this communications node and other nodes to which data can be transferred from ports other than the root port thereof. As a result, the range of data transfer can be suppressed to a necessary minimum, and a data is never transferred to communications nodes not concerned in the data transfer. Therefore, each communications node can be prevented from postponing its own processing due to unnecessary data receipt and repeat. Furthermore, since the local network capable of independent data transfer therein is formed by the communications nodes not concerned in the data transfer, plural data transfer can be executed in parallel in point of time. Accordingly, the bus use efficiency in data transfer can be improved, and power consumption can be reduced by avoiding unnecessary data receipt and repeat.

In the communications node of the invention, in receiving the NW signal at the root port, if the communications node has a function as a root node, the communications node preferably starts to operate as a local root node for controlling arbitration in the local network, and if the communications node does not have a function as a root node, the communications node preferably sends a local root node setting signal for directing any of the other communications nodes to operate as a local root node. Furthermore, when the communications node of the invention sends the local root node setting signal, the communications node preferably cancels recognition of the original root port having received the NW signal and recognizes a port having sent the local root node setting signal as a new root port. Moreover, when receipt of the NW signal at the original root port is terminated, if the communications node is a local root node, the communications node preferably stops operating as the local root node, and if the communications node is not a local root node, the communications node preferably sends a local root node canceling signal for directing another communications node operating as a local root node to stop operating as the local root node.

Furthermore, in initialization of the network, the communications node of the invention preferably sends information on the communications node from the respective ports thereof and stores information on other communications nodes received at the respective ports thereof. In addition, the communications node of the invention preferably identifies a port for sending a data by comparing a node number of the destination communications node of the data with node numbers of other communications nodes to which data is transferable from the respective ports thereof included in the information stored in the initialization of the network.

Moreover, in receiving a data, when a port capable of data transfer to the destination communications node of the data is not in a transferable state, the communications node of the invention preferably sends a signal indicating that the data is untransferable to a port capable of data transfer to a sender communication node of the data.

Additionally, the communications node of the invention preferably has a function to specify a broadcast communication time.

Furthermore, in the communications node of the invention, when an NW signal or an RNW signal corresponding to a repeated NW signal is received at a port other than the root port, the communications node preferably repeats the RNW signal to the root port, a signal is preferably not received at a port sending an NW signal, and a signal received at another port is preferably repeatable to a port sending or receiving an RNW signal, and when an arbitration signal is received at a port sending an RNW signal, the communications node preferably terminates sending the RNW signal.

Alternatively, the network system of this invention comprises a plurality of communications nodes of this invention connected through buses.

Alternatively, the method of this invention of controlling network system including a plurality of communications nodes connected through buses, comprises the steps of specifying a data transfer path in sending a data from one communications node to another communications node; and forming a local network capable of independent data transfer therein by communications nodes not belonging to the data transfer path.

In the method of controlling a network system of this invention, the local network capable of independent data transfer therein is formed by communications nodes not belonging to the specified data transfer path, and hence, plural data transfer can be executed in parallel in point of time. Accordingly, the bus use efficiency in data transfer can be improved. Also, power consumption can be reduced by avoiding unnecessary data receipt and repeat.

The method of controlling a network system of this invention preferably further comprises a step of setting one communications node belonging to the local network as a local root node for mediating arbitration in the local network.

DETAILED DESCRIPTION OF THE INVENTION

First, terms used herein will be defined as follows:

A "root node" means a communications node for mediating arbitration in a network system. Merely one root node is determined in the network system in an initialization process conducted in turning power on or resetting. A "root port" means a port connected with a path to a root node among ports of each communications node. A "disable port" means a root port that is placed in a non-root port state in response to a "now working" signal (hereinafter referred to as the "NW signal"), that is, a control signal for indicating that a data is being sent. A "child port" means a port other than a root port and a disable port.

Furthermore, the following terms are also used for describing the present invention.

A "local network" means a partial network divided by nodes participating in data communications. Within a local network, data communications can be independently conducted. A "local root node" means a communications node for mediating arbitration in a local network, and merely one local root node is determined in the local network. Furthermore, a port connected with a path to a local root node among ports of each communications node is herein also designated as a "root port". "Path information of a port" means information indicating which of a root port, a child port and a disable port the port is.

Now, the basic concept of the invention will be described.

Figure 1:
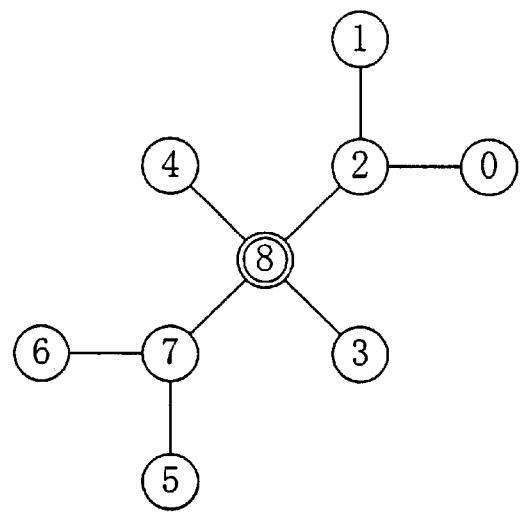
FIG. 1 is a conceptual diagram for showing the configuration of a network system including plural communications nodes.

FIG. 1 is a conceptual diagram for showing the configuration of a network system including plural communications nodes connected through buses. In FIG. 1, each circle corresponds to a communications node, and a numerical value in each circle indicates a node number of the communications node. A line connecting the circles indicates a bus between the communications nodes. In FIG. 1, it is assumed that a node 8 surrounded with a double circle is determined as a root node.

Each communications node is connected with a host, so as to communicate with another communication node in accordance with a predetermined protocol in response to a request from the host. The host can be any device, such as a keyboard, a disk drive, a printer and a CPU, as far as it is necessary to communicate with other components.

In the network system of FIG. 1, a data is transferred from a node 3 to a node 4 as follows: When none of the communications nodes conducts data transfer, all the communications nodes can start arbitration. When the node 3 starts arbitration, the node 8 corresponding to the root node gives bus access permission to the node 3 because the other communications nodes is not conducting arbitration. The node 3 identifies the node 4 as the destination of the data, and sends the data from a port connected with the node 8 selected as a sending port. The node 8 recognizes that the destination of the received data is the node 4, and hence repeats the received data to a port connected with a path to the node 4 and sends an NW signal, that is, a control signal for indicating that the data is being transferred, to ports that are not concerned in the data transfer and connected with other nodes.

Figure 2:
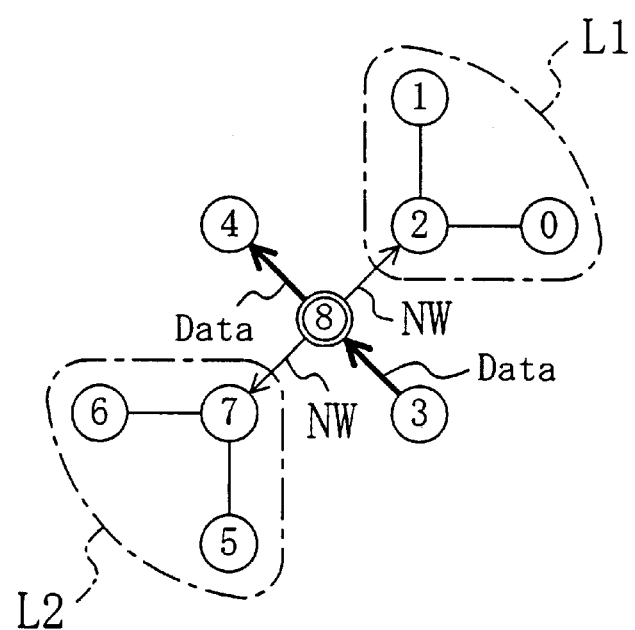
FIG. 2 is a diagram for showing a result of executing an operation according to the invention by the respective communications nodes in the network of FIG. 1.

As a result of this operation, the network of FIG. 1 is placed in a state as is shown in FIG. 2. Specifically, the data is transferred from the node 3 through the node 8 to the node 4, and the NW signal NW is output from the node 8 to nodes 2 and 7.

As a result, the nodes 0, 1 and 2 together form a first local network L1 and the nodes 5, 6 and 7 together form a second local network L2. Within each of the first and second local networks L1 and L2, a data can be transferred independently of the data transfer from the node 3 to the node 4.

Now, an embodiment of the invention will be described.

As a premise in this embodiment, the following rules are adopted for realizing communications nodes: Each communications node has one or plural ports; each port of the communications node has its own signal transceiver, encoder and decoder; merely one port of each communications node can send a data, with all the other ports capable of sending a control signal different from the data; and each port has information for recognizing whether or not the port is connected with a path to a root node.

Also, procedures in bus arbitration will not be described in detail in the following description. This is because a variety of methods are generally known for bus arbitration, and hence, the bus arbitration can be easily realized by those skilled in the art and there is no need to adopt a specific method for bus arbitration in order to practice the invention. It is, however, assumed for the sake of simplification that the bus arbitration is herein conducted by a method used in IEEE 1394 unless described otherwise.

Figure 3A:
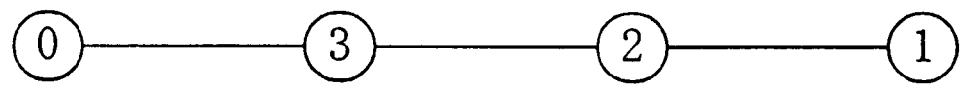
FIGS. 3(a) through 3(c) are diagrams for showing an operation of communications nodes according to an embodiment of the invention in which, during data transfer, another node sends a data.
Figure 3B:
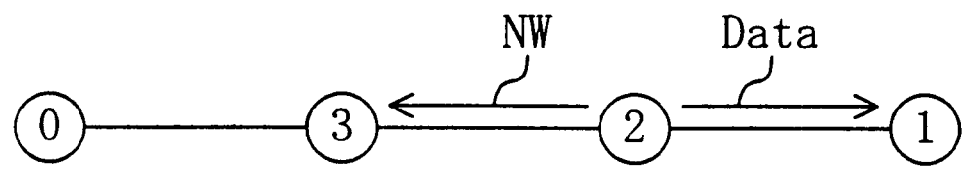
Figure 3C:
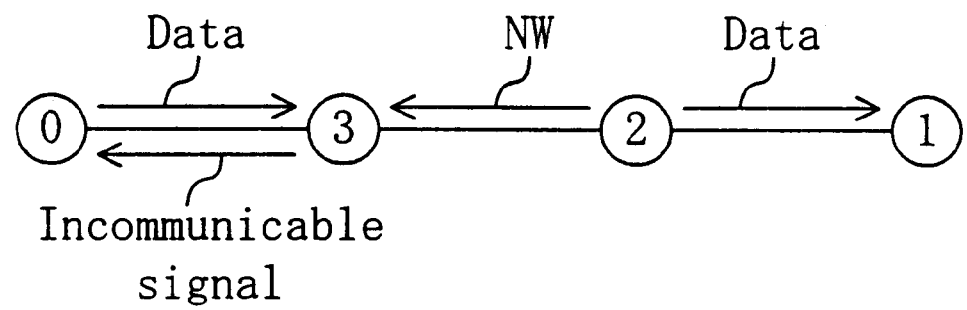

FIGS. 3(a) through 3(c) are diagrams for showing an operation according to this embodiment in which, during data transfer, another node sends a data. When a data is transferred from a node 2 to a node 1 in a network shown in FIG. 3(a), the network is placed in a state as is shown in FIG. 3(b). Specifically, the node 2 sends the data to the node 1 and outputs an NW signal to a node 3. At this point, when a node 0 is to send a data to the node 2, the network is placed in a state as is shown in FIG. 3(c). Specifically, the node 3 having received the data checks the destination node of the received data, and recognizes that the data is to be repeated to the node 2. Next, the node 3 detects a port connected with the node 2, and checks whether or not the detected port is in a transferable state. In this case, the port connected with the node 2 is receiving the NW signal and hence is not placed in a transferable state. Therefore, the node 3 generates a request to send, to the node 0, a signal indicating that the data cannot be sent, and sends an incommunicable signal to the node 0 as soon as the data transfer from the node 0 is completed. When the node 0 receives the incommunicable signal, the node 0 recognizes that the data transfer attempted immediately before is not normally conducted, and hence generates a request to send the data again.

FIGS. 4(a) through 4(e) are diagrams for showing operations for forming a local network and setting and canceling a local root node in this embodiment. In FIGS. 4(a) through 4(e), each circle corresponds to a communications node, a numerical value in each circle indicates a node number of the communications node, R indicates a root port, C indicates a child port and D indicates a disable port. Also, a line between the communications nodes indicates a bus for connecting ports of the communications nodes. It is assumed, in the network shown in FIGS. 4(a) through 4(e), that a node 11 is determined as a root node.

Referring to the network of FIGS. 4(a) through 4(e), the operations of respective communications nodes will be described by exemplifying a case where data transfer from a node 0 to a node 1 occurs and data transfer from a node 3 to a node 7 subsequently occurs.

Figure 4A:
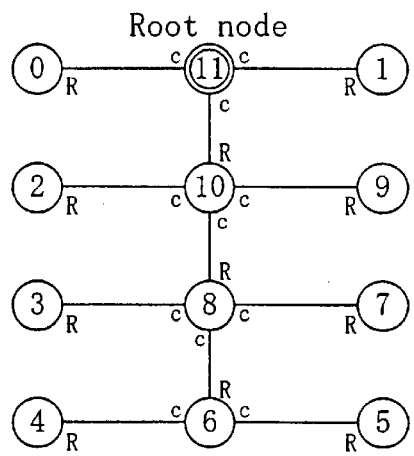
FIGS. 4(a) through 4(e) are diagrams for showing operations for data transfer in a network including communications nodes according to the embodiment of the invention.
Figure 4B:
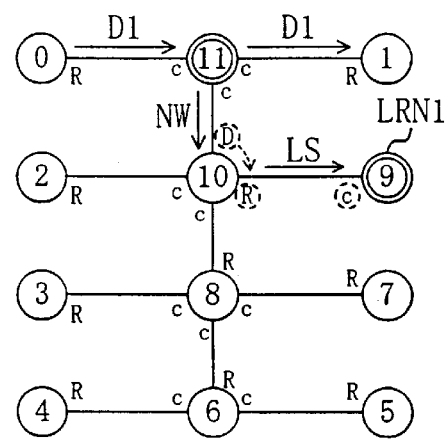

In the data transfer from the node 0 to the node 1, the network is placed in a state as is shown in FIG. 4(b). Specifically, when the node 0 sends a data D1, the node 11 receives the data D1 and repeats the data D1 to a port connected with the node 1, and sends an NW signal to another port, namely, a port connected with a node 10. The node 1 fetches the received data D1. Since the node 10 receives the NW signal at its root port, it sets the root port as a disable port and conducts a "local root node setting process" so as to form a local network.

At this point, it is assumed that the node 10 itself does not have a function as a root node but a node 9 has a function as a root node. The node 10 searches for a node capable of functioning as a root node. When the node 10 recognizes that the node 9 can function as a root node, the node 10 sends a local root node setting signal LS to the node 9 identified as a local root node candidate. In addition, the node 10 cancels the setting as a root port of the port connected with the node 11 (which has already been set as a disable port), and sets a port connected with the node 9 as a root port. Thus, the node conducts so-called switching of a root port. When the node 9 receives the local root node setting signal LS, it starts to work as a first local root node LRN1, cancels the setting as a root port of the port connected with the node 10 and sets this port as a child port.

Figure 4C:
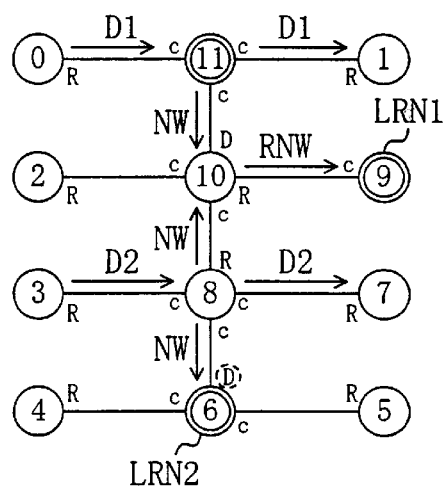

When a data is to be transferred from the node 3 to the node 7 in this state, the network is placed in a state shown in FIG. 4(c). Specifically, when the node 3 sends a data D2, a node 8 receives the data D2 and repeats the data D2 to a port connected with the node 7, and sends an NW signal to ports connected with the nodes 10 and 6. The node 7 fetches the received data D2. Since the node 6 receives the NW signal at its root port, it sets this root port as a disable port, and conducts the "local root node setting process" so as to form a new local network. In this case, it is assumed that the node 6 itself has a function as a root node. When the node 6 recognizes that the node 6 itself can function as a root node, the node 6 sets itself as a second local root node LRN2. At this point, since the node 10 receives the NW signal at its child port, the node 10 outputs an RNW signal to the node 9, that is, the root node.

Figure 4D:
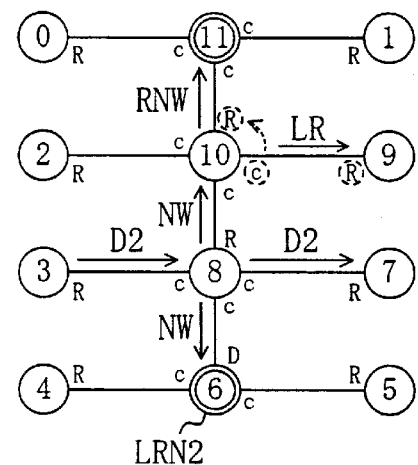

When the data transfer from the node 0 to the node 1 is completed in this state, the network is placed in a state shown in FIG. 4(d). Specifically, the node 11 terminates repeating the data D1 and stops sending the NW signal to the node 10.

Since the receipt of the NW signal at the port connected with the node 11, namely, the port currently set as the disable port, is terminated, the node 10 conducts a "local root node canceling process".

Specifically, when the node 10 detects that the node 10 itself is not a local root node, the node 10 sends a local root node canceling signal LR from its ports connected with the nodes 2 and 9 that are in a transferable state. In addition, the node 10 restores path information of its ports to the prior state. As a result, the setting as the root port is restored from the port connected with the node 9 to the port connected with the node 11. The nodes 2 and 9 receive the local root node canceling signal LR and restore the path information of their ports to the prior state. Since the node 10 switches the root port, the RNW signal is output not to the node 9 but to the node 11. At this point, the node 9 cancels the setting of itself as the first local root node LRN1.

Figure 4E:
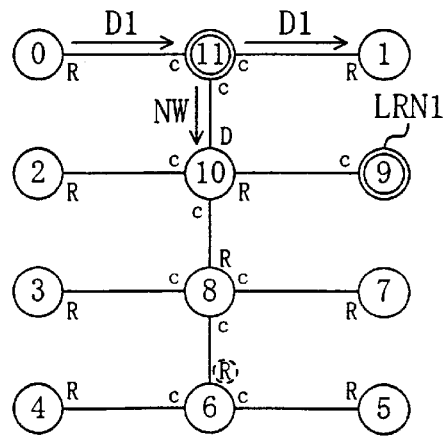

Furthermore, when the data transfer from the node 3 to the node 7 is completed in the state of FIG. 4(c), the network is placed in a state shown in FIG. 4(e). Specifically, when the transfer of the data D2 from the node 3 to the node 7 is completed, the node 8 stops sending the NW signal to the nodes and 6. At this point, since the receipt of the NW signal at the child port is terminated, the node 10 stops repeating the NW signal to the node 9. Since the receipt of the NW signal at the port connected with the node 8, which is originally a root port and currently a disable port, is terminated, the node 6 conducts the "local root node canceling process". Since the node 6 itself is the second local root node LRN2, the node 6 cancels the setting of itself as the second local root node LRN2, and sets the disable port as a root port. In other words, the node 6 restores the path information of the ports to the prior state.

FIGS. 5 through 12 are flowcharts for showing the operation of a communications node according to this embodiment. Respective communications nodes are operated in accordance with the flowcharts of FIGS. 5 through 12, so as to realize the operation as is shown in FIGS. 4(a) through 4(e).

Figure 5:
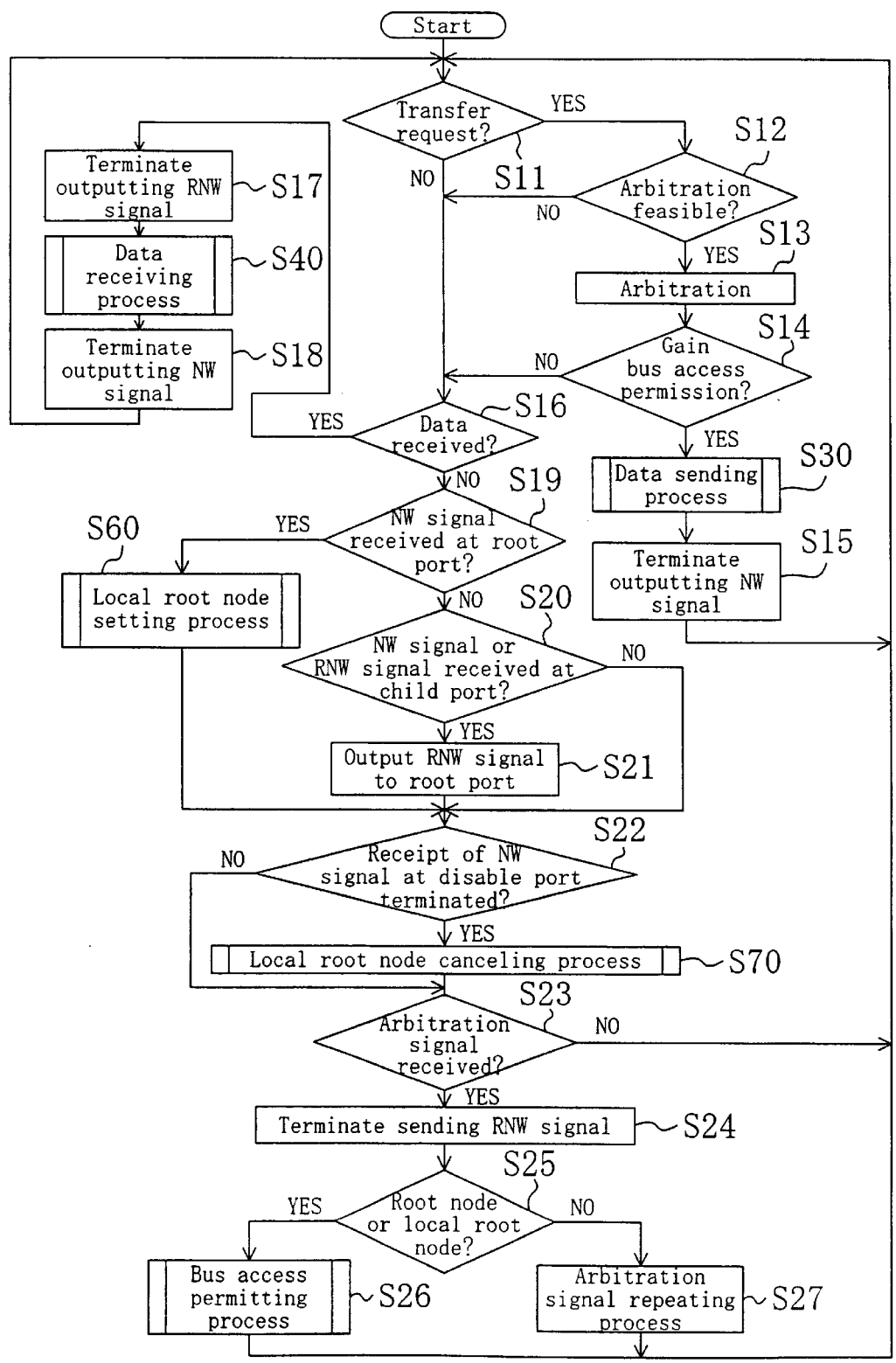
FIG. 5 is a flowchart for showing an operation of a communications node according to the embodiment of the invention.

Before conducting the operation shown in FIG. 5, the network is initialized, the node numbers of respective communications nodes are uniquely determined, and the network is placed in a state capable of starting normal data transfer.

In step S11, a communications node examines whether or not it is requested data transfer from a host. When it is requested data transfer, the procedure proceeds to step S12, and when not, the procedure proceeds to step S16.

In step S12, the communications node that is requested data transfer from the host examines whether or not arbitration can be conducted with a root node or a local root node. For conducting arbitration, it is necessary that a timing condition for starting arbitration is satisfied and that the communications node is not sending or receiving a data or an arbitration signal. However, when the communications node is outputting an RNW signal to its root port merely as repeat of an NW signal, arbitration can be conducted. When such conditions for arbitration are satisfied, the communications node starts arbitration in step S13. At this point, an arbitration signal can be output to a port other than a port sending or receiving an NW signal. In other words, the arbitration signal can be output to a port sending or receiving an RNW signal. When the conditions are not satisfied, the procedure proceeds to step S16 with the processing for the data transfer request postponed.

In arbitration, it is determined which signal is to be output to which port in accordance with a bus protocol. For example, in the arbitration protocol of IEEE 1394, a root port is supplied with a bus request signal for demanding bus access permission, and a child port is supplied with a data preface signal for indicating that a data is to be sent so as to prevent the child port from outputting a new request signal.

In this embodiment, the communications node can be provided with a function for specifying a broadcast communication time. In this case, the communications node identifies the kind of a transfer request from the host, processes a transfer request of broadcast communication alone during the broadcast communication time, and processes a transfer request other than the broadcast communication alone during time other than the broadcast communication time. When a transfer request other than the broadcast communication occurs during the broadcast communication time, the transfer request is held until the broadcast communication time elapses, and on the contrary, when a transfer request of broadcast communication occurs during time other than the broadcast communication time, the transfer request is held until the broadcast communication time starts.

The result of the arbitration conducted in step S13 is distinguished in step S14, and when the communications node wins the arbitration to gain bus access permission, the procedure proceeds to step S30 for conducting a "data sending process"(described in detail below). When the communications node loses the arbitration and does not gain bus access permission, the procedure proceeds to step S16 with the processing for the transfer request postponed.

In step S16, the communications node examines whether or not a data is received at any port thereof. When a data is received, the procedure proceeds to step S17. The communications node should receive an arbitration signal before receiving a data. Thus, it is found that any node on the bus has won arbitration and is to start data transfer, and therefore, a node sending an RNW signal as repeat of an NW signal stops sending the RNW signal. Then, the procedure proceeds to step S40 for conducting a "data receiving process" (described in detail below). When it is found in step S16 that a data is not received, the procedure proceeds to step S19.

In step S19, the communications node examines whether or not an NW signal is received at the root port, and when the NW signal is received, the procedure proceeds to step S60 for conducting a "local root node setting process" (described in detail below). When the NW signal is not received, the procedure proceeds to step S20.

In step S20, the communications node examines whether or not an NW signal or an RNW signal is received at a child port. When an NW signal or an RNW signal is received at any child port, the procedure proceeds to step S21. In step S21, an RNW signal is output to the root port, and the procedure proceeds to step S22. When neither an NW signal nor an RNW signal is received at any of the ports, the procedure directly proceeds to step S22.

When there is no need, in the procedures of the protocol, for a root node or a local root node to find out that data transfer is being conducted in any part of a bus, there is no need to repeat an NW signal to the root port (namely, to output an RNW signal) in step S21. In this case, the examination conducted in step S20 is also unnecessary.

In step S22, the communications node examines whether or not the receipt of the NW signal at the disable port is terminated. When the receipt is terminated, the procedure proceeds to step S70 for conducting a "local root node canceling process". When the receipt of the NW signal is continued, the procedure proceeds to step S23, where it is determined whether or not an arbitration signal is received. When it is determined in step S23 that an arbitration signal is not received, the procedure returns to step S11.

When an arbitration signal is received, the procedure proceeds to step S24, and when the port receiving the arbitration signal is sending an RNW signal, the port stops sending the RNW signal. Subsequently in step S25, the communications node examines whether or not it is a root node or a local root node. When the communications node itself is a root node or a local root node, the procedure proceeds to step S26 for conducting a bus access permitting process, and when not, the procedure proceeds to step S27 for conducing an arbitration signal repeating process.

The arbitration signal repeating process of step S27 can be executed in accordance with the bus protocol. In order to practice the present invention, however, there is a restriction that an arbitration signal is not repeated to a port sending or receiving an NW signal and a disable port. An arbitration signal can be repeated to a port sending or receiving an RNW signal. When an arbitration signal is repeated to a port sending or receiving an RNW signal, the RNW signal is stopped before repeating the arbitration signal.

Figure 12:
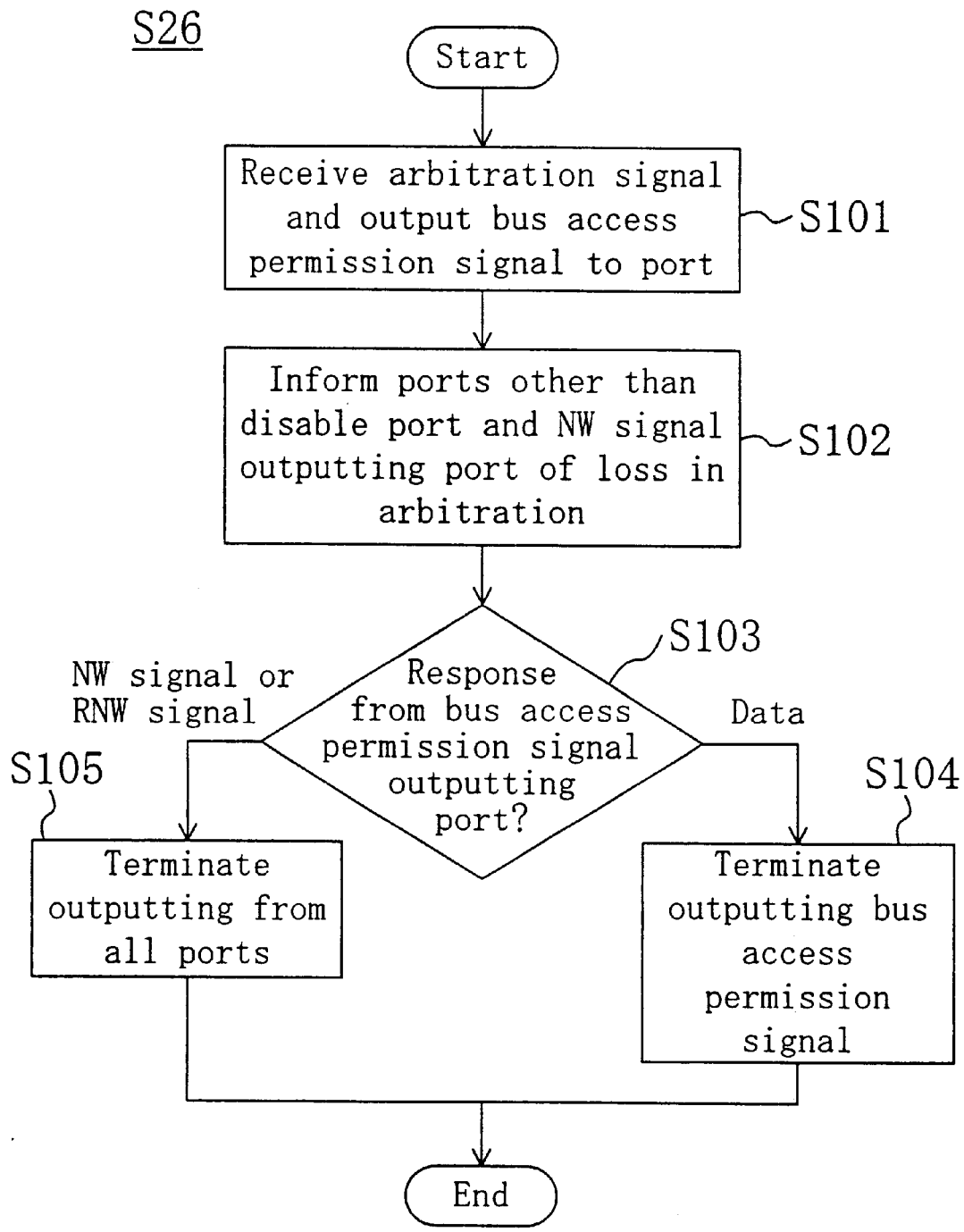
FIG. 12 is a flowchart for showing detailed procedures in a bus access permitting process in the operation of the communications node shown in FIG. 5.

FIG. 12 is a flowchart for showing detailed procedures in the bus access permitting process conducted in step S26. A root node or a local root node should mediate arbitration conducted by other nodes, so that merely one node within a local network can send a data. When a root node or a local root node receives an arbitration signal for requesting bus access permission within in the local network, the root node or the local root node executes the bus access permitting process S26.

First, in step S101, a permission signal for indicating bus access permission is output to a port that has received the arbitration signal. When plural arbitrations simultaneously occur, one of the arbitrations is selected before sending a permission signal. Then in step S102, a signal for indicating a loss in the arbitration is sent to all the ports excluding the port for outputting the permission signal, a disable port and a port sending or receiving an NW signal.

Next, in step S103, the root node or the local root node checks response to the permission signal. At this point, when the node having received the permission signal sends a data, the procedure proceeds to step S104, where the transmission of the permission signal is terminated and the process is completed. On the other hand, when an NW signal or an RNW signal is received at the port having sent the permission signal, this means data transfer has been started in a network connected with this port. Therefore, the procedure proceeds to step S105, where the output of all the ports is terminated and the process is completed.

Figure 6:
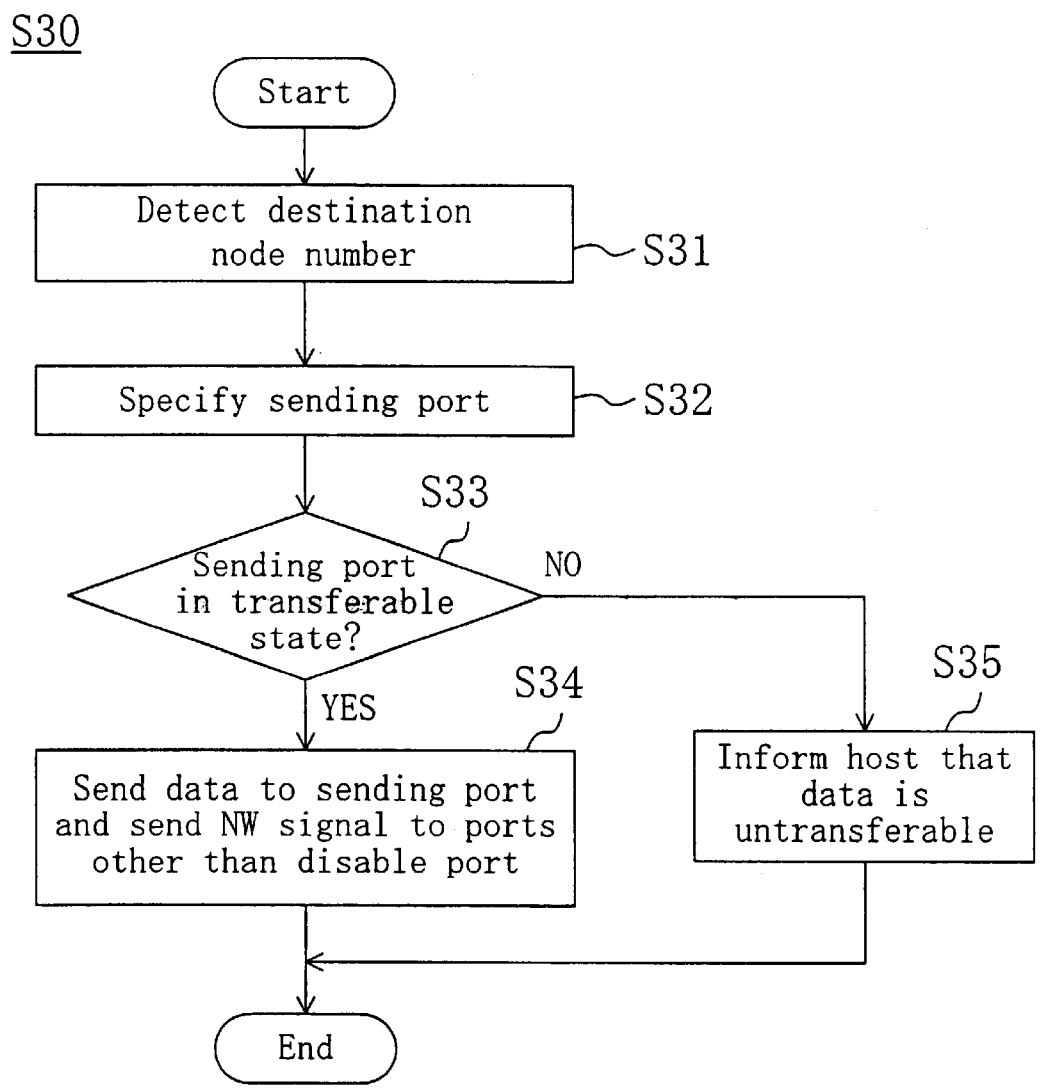
FIG. 6 is a flowchart for showing detailed procedures in a data sending process in the operation of the communications node shown in FIG. 5.

FIG. 6 is a flowchart for showing detailed procedures in the data sending process S30. When a communications node receives a transfer request from its host and gains bus access permission as a result of arbitration, the communications node executes the data sending process S30.

First, in step S31, the communications node detects a node number of the destination of the transmitted data passed from the host. In a general standard for network control, the node number of a destination is included in a header of a data signal, and hence can be easily detected. Next, in step S32, the node number of the destination detected in step S31 is compared with node numbers of nodes capable of data transfer from each port that are stored in the initialization of the network, so as to specify, as a sending port, a port capable of transferring the data to a node having a node number according to that of the destination.

Then, in step S33, it is determined whether or not the sending port is in a transferable state. At this point, when the sending port is not receiving an NW signal and is not a disable port, the sending port is determined to be in a transferable state. When the sending port is in a transferable state, the procedure proceeds to step S34, where the data is sent to the sending port and an NW signal is sent to the other ports excluding a disable port, and the data sending process S30 is ended when the data transfer is completed. When the sending port is not in a transferable state, the procedure proceeds to step S35, where the host is informed that the data cannot be sent and the data sending process S30 is ended.

Figure 7:
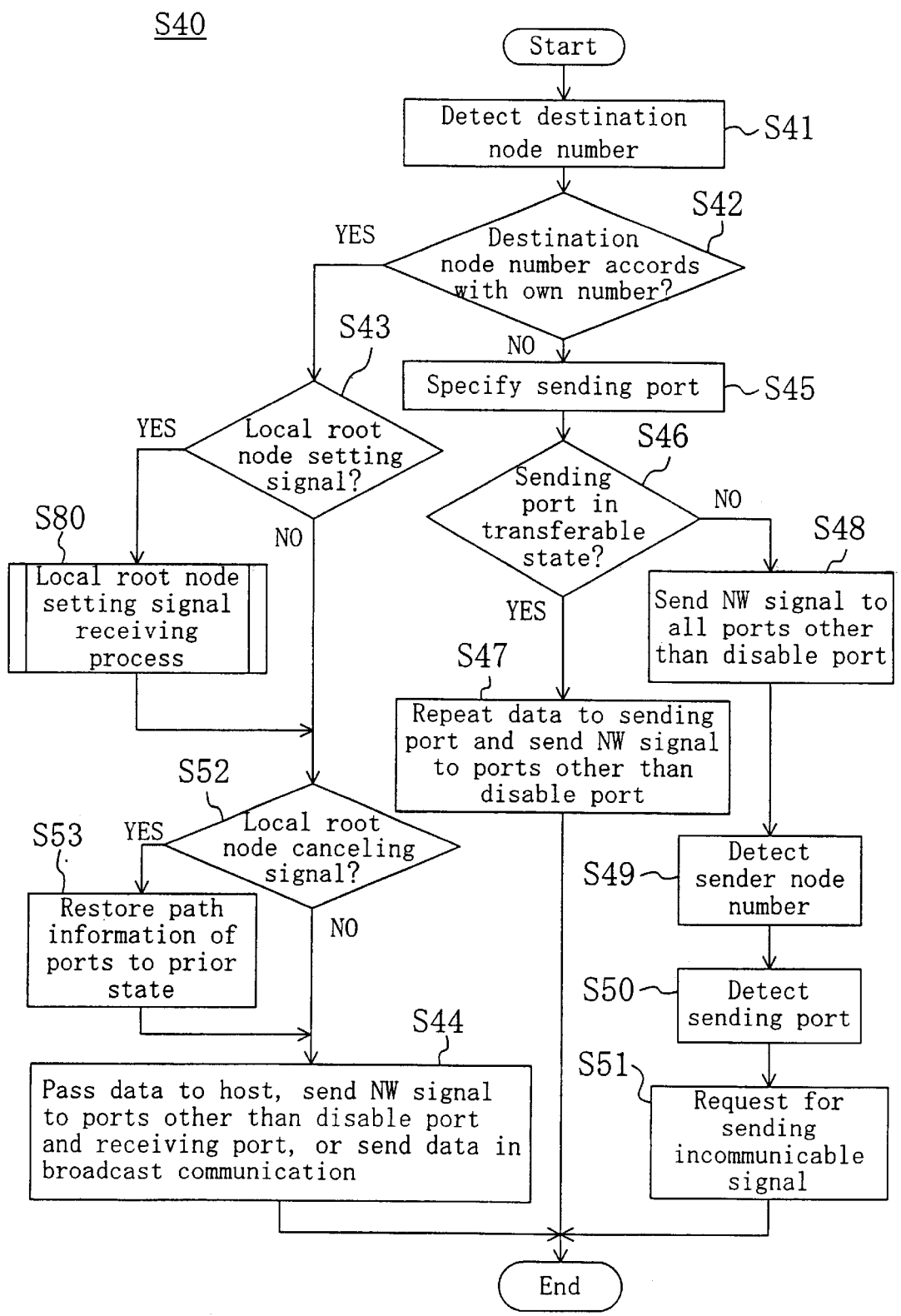
FIG. 7 is a flowchart for showing detailed procedures in a data receiving process in the operation of the communications node shown in FIG. 5.

FIG. 7 is a flowchart for showing detailed procedures in the data receiving process S40. When a communications node receives a data, the communications node executes the data receiving process S40.

First, in step S41, the communications node detects the node number of the destination of the received data. Then, in step S42, the communications node compares the detected node number of the destination with its own node number. When these node numbers accord with each other, the communications node identifies itself as the destination of the received data, and the procedure proceeds to step S43.

In step S43, it is determined whether or not the received data is a local root node setting signal. When the data is a local root node setting signal, the procedure proceeds to step S80 for executing a "local root node setting signal receiving process"(described in detail below). When not, the procedure proceeds to step S52, where it is determined whether or not the received data is a local root node canceling signal. When the data is a local root node canceling signal, the procedure proceeds to step S53, where the communications node restores the path information of its ports to a state prior to the local root node setting process. When not, the procedure proceeds to step S44, where the received data is passed to the host and an NW signal (or a data in the case of broadcast communication) to the ports excluding the port having received the data and a disable port. When this data transmission is completed, the data receiving process S40 is ended.

When the node number of the destination of the received data does not accord with the node number of the communications node itself in step S42, the procedure proceeds to step S45.

In step S45, the detected node number of the destination is compared with node numbers of nodes capable of data transfer from each port that are stored in the initialization of the network, so as to specify, as a sending port, a port capable of transferring the data to a node having a node number according to the node number of the destination.

In step S46, it is determined whether or not the sending port specified in step S45 is in a transferable state. At this point, when the sending port is not receiving an NW signal, the sending port is determined to be in a transferable state. When the sending port is in a transferable state, the procedure proceeds to step S47. In step S47, the received data is repeated to the sending port specified in step S45, an NW signal is sent to the ports other than the port having received the data, the sending port and a disable port, and the data receiving process S40 is ended when the data transfer and the repeat are completed.

When the sending port is not in a transferable state, the procedure proceeds to step S48, where an NW signal is sent to all the ports excluding the port having received the data and a disable port. Then in step S49, a node number of a sender of the received data is detected in the header of the received data. Next, in step S50, the detected node number of the sender is compared with node numbers of nodes capable of data transfer from each port that are stored in the initialization of the network, so as to specify a port capable of data transfer to a node having a node number according to the node number of the sender as a port for informing that the data is untransferable. In step S51, a request for sending the sender a signal indicating that the data is untransferable is generated, and the data receiving process S40 is ended when the receipt of the data and the repeat are completed.

Figure 8:
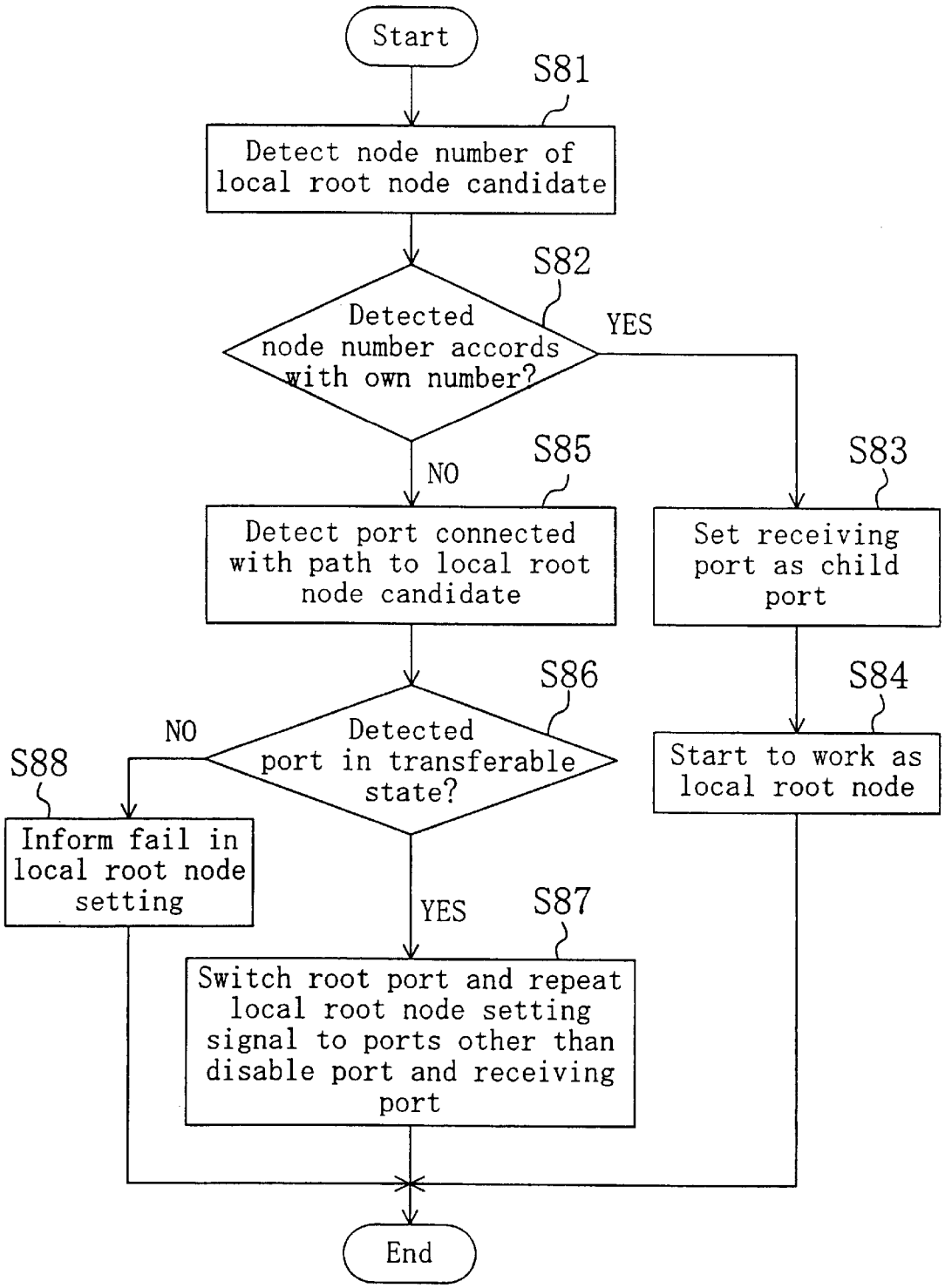
FIG. 8 is a flowchart for showing detailed procedures in a local root node setting signal receiving process in the data receiving process shown in FIG. 7.

FIG. 8 is a flowchart for showing detailed procedures in the local root node setting signal receiving process S80. When the received data is found to be a local root node setting signal in the data receiving process S40, the communications node executes the local root node setting signal receiving process S80.

First, in step S81, a node number of a local root node candidate is detected in the received local root node setting signal. Next, in step S82, the detected node number of the local root node candidate is compared with the node number of the communications node itself.

When these node numbers accord with each other, the procedure proceeds to step S83, where the port having received the local root node setting signal is set as a child port. Then, in step S84, the communications node starts an operation as the local root node, and the local root node setting signal receiving process S80 is completed.

When the node numbers do not accord with each other, the procedure proceeds to step S85, where a port connected with a path to the local root node candidate is detected. In step S86, it is checked whether or not the port detected in step S85 is in a transferable state. At this point, when the detected port is not receiving an NW signal, the port is determined to be in a transferable state.

When the detected port is in a transferable state, the procedure proceeds to step S87, where the root port is switched. Specifically, the detected port is recognized as a root port and the original root port is canceled to be recognized as a root port and is recognized as a child port. In addition, the local root node setting signal is repeated to ports other than the port having received the local root node setting signal and a disable port, and the local root node setting signal receiving process S80 is completed.

When the detected port is not in a transferable state, a signal for informing fail in the local root node setting is sent, and the local root node setting signal receiving process S80 is completed. The signal for indicating fail in the local root node setting is preferably sent by broadcast communication or sent to merely a port whose port path information is updated in accordance with the local root node setting signal. When a communications node receives the signal for informing fail in the local root node setting, the communications node should restore the path information of all its ports to the prior state.

Figure 9:
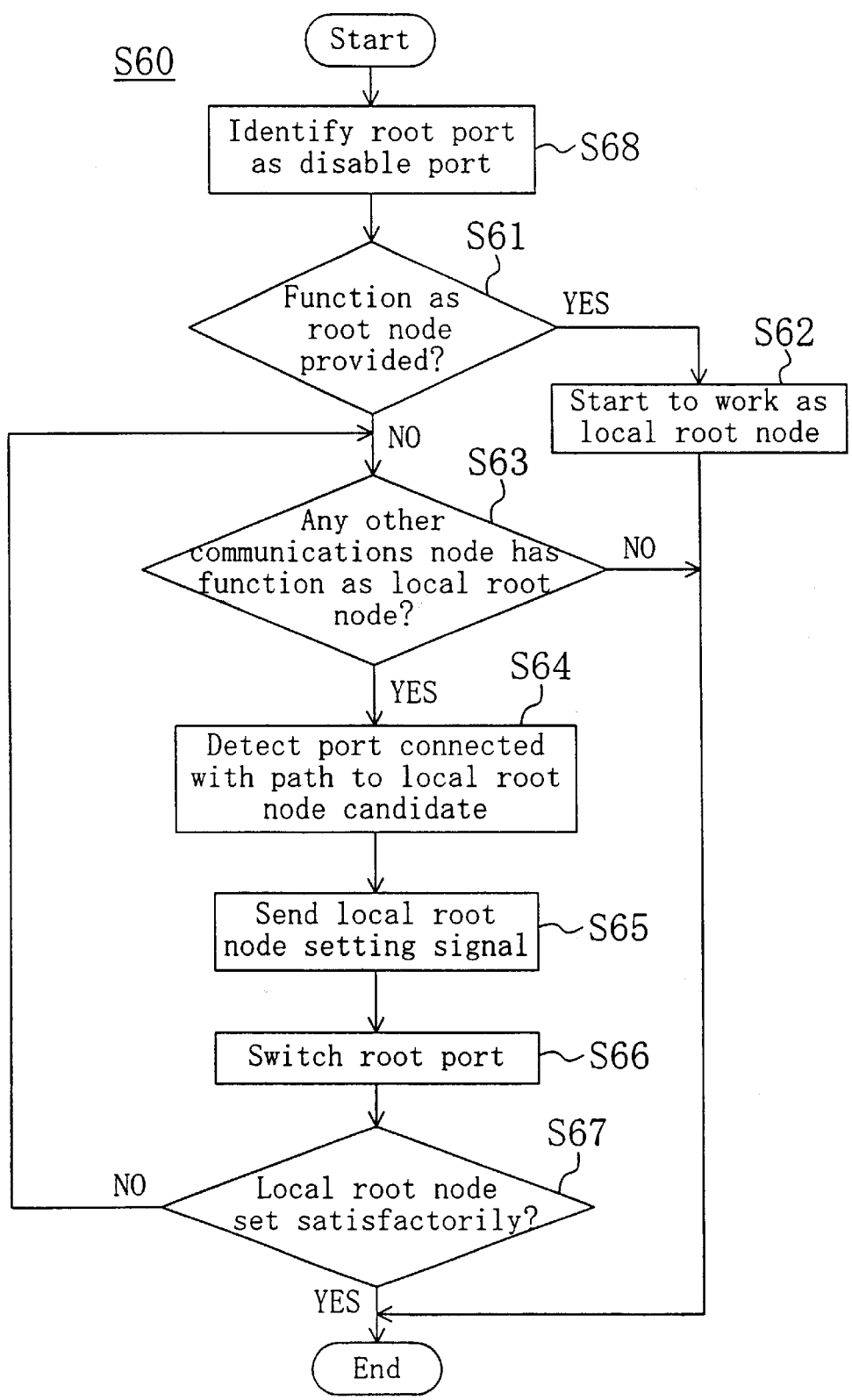
FIG. 9 is a flowchart for showing detailed procedures in a local root node setting process in the operation of the communications node shown in FIG. 5.

FIG. 9 is a flowchart for showing detailed procedures in the local root node setting process S60. When a communications node receives an NW signal at its root port, the communications node executes the local root node setting process S60.

First, in step S68, the communications node recognizes the root port having received the NW signal as a disable port.

Next, in step S61, it is determined whether or not the communications node itself has a function as a root node. In general, such information is held in a register or the like within each communications node, and hence, this determination can be easily made. When the communications node has the function as a root node, the procedure proceeds to step S62, where the communications node starts to work as a local root node, and the local root node setting process S60 is completed.

When the communications node does not have the function as a root node, the procedure proceeds to step S63, where a node having the function as a root node is searched for among nodes capable of data transfer from the ports excluding a disable port of the communications node on the basis of the node information stored in the initialization of the network. When there is no node having the function as a root node, the local root node setting process S60 is completed.

When there is any node having the function as a root node, the procedure proceeds to step S64, where this node is identified as a local root node candidate and a port connected with a path to the local root node candidate is detected. Next, in step S65, the communications node sends a local root node setting signal for directing the local root node candidate to work as a root node of the local network. Furthermore, in step S66, the port detected in step S64 is recognized as a root port, and the port having received the NW signal is canceled to be recognized as a root port, namely, the root port is switched.

A local root node setting signal preferably has higher priority than normal data transfer and is preferably transmitted by broadcast communication immediately after there arises necessity for determining a local root node, so that a node having received the local root node setting signal can be prevented from sending another local root node setting signal and that arbitration can be prevented from being started before determining a local root node.

Next, in step S67, it is determined whether or not a local root node has been successfully set. This determination can be made by any method, for example, a method in which a node directed to work as a local root node is made to send a response signal indicating that the node has started to work as a local root node, or a method in which the successful setting of a local root node is confirmed when a signal indicating that a data is untransferable is not received for a predetermined period of time.

When the local root node is successfully set in step S67, the local root node setting process S60 is completed. When the setting of the local root node has failed, the procedure returns to step S63, where another local root node candidate is searched for.

Figure 10:
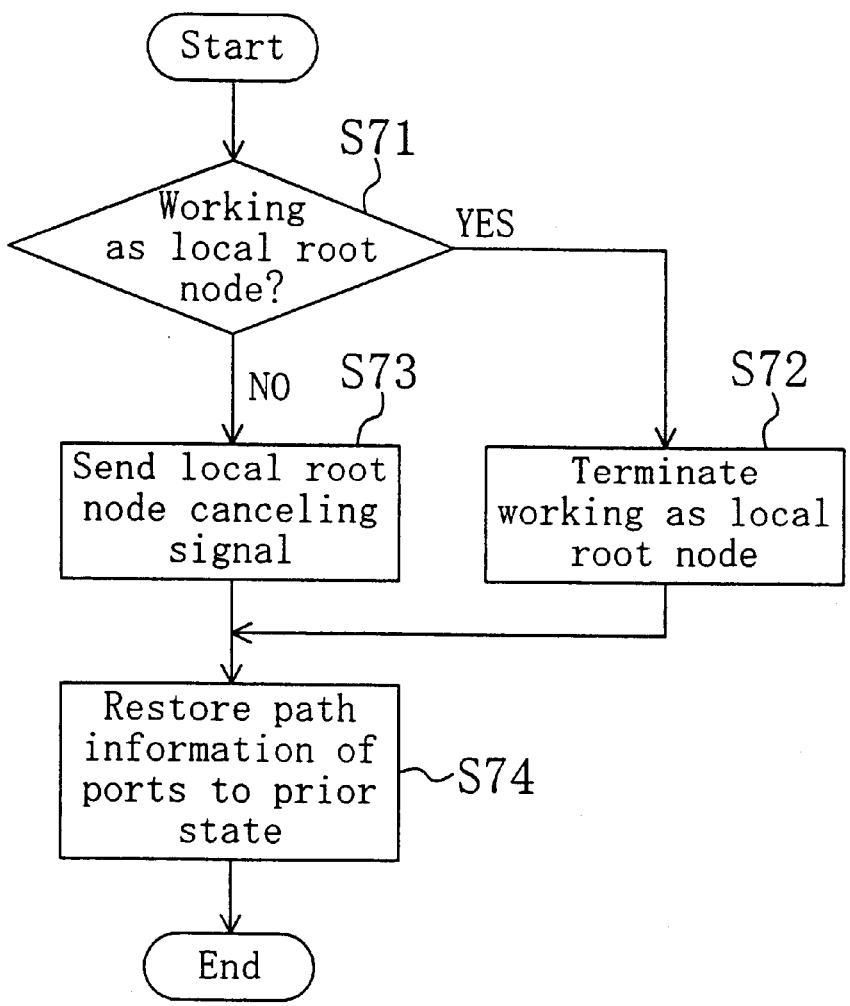
FIG. 10 is a flowchart for showing detailed procedures in a local root node canceling process in the operation of the communications node shown in FIG. 5.

FIG. 10 is a flowchart for showing detailed procedures for the local root node canceling process S70. When the receipt of an NW signal at the disable port of a communications node is terminated, the communications node executes the local root node canceling process S70.

First, in step S71, it is determined whether or not the communications node itself is a local root node. When the communications node is a local root node, the procedure proceeds to step S72, where the communications node terminates working as a local root node and the local root node canceling process S70 is completed.

When the communications node is not a local root node, the procedure proceeds to step S73, where a local root node canceling signal for instructing termination of the operation as a local root node is sent to transferable ports excluding the root port having received the NW signal. The local root node canceling signal is preferably sent by broadcast communication. Ultimately in step S74, after restoring the path information of the ports to the prior state (specifically, the disable port is returned to a root port and when the communications node is not a local root node, the root port is returned to a child port), and the local root node canceling process S70 is completed.

When a communications node receives a local root node canceling signal, the communications node should restore the path information of all the ports to the prior state. As a result, the path information of the ports of all nodes included in the local network can be returned to a state prior to the setting of the local root node.

Figure 11:
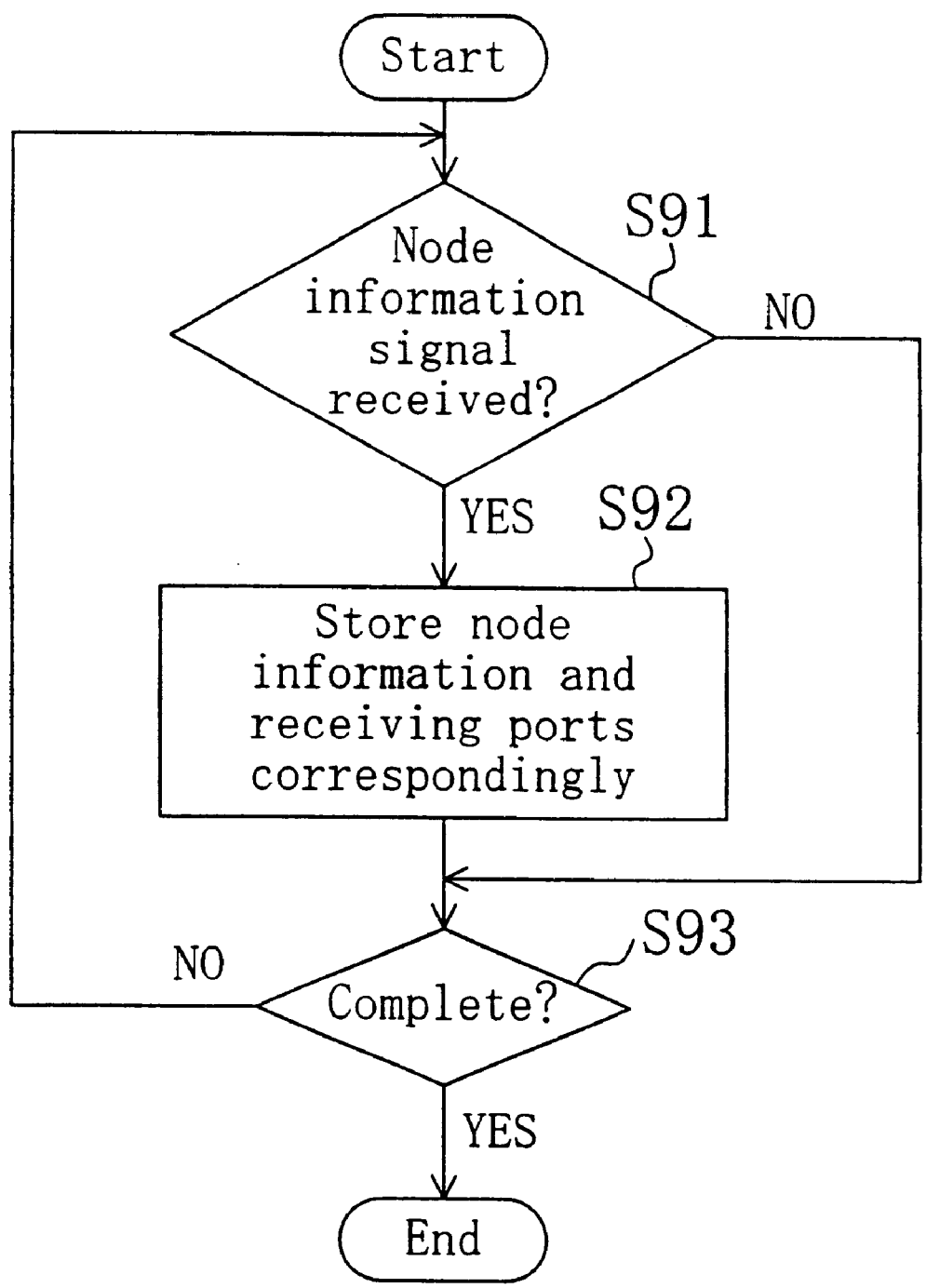
FIG. 11 is a flowchart for showing an operation of the communications node in initialization of a network.

FIG. 11 is a flowchart for showing procedures of an operation of a communications node in the initialization of the network. When a bus is reset by turning power on or the like, each communications node executes the initialization process as is shown in FIG. 11.

First, in step S91, it is determined whether or not a node information signal sent from each node is received. For example, in the protocol according to the IEEE 1394 Standard, the node information signal includes information such as a node number, the number of ports, a transfer rate and whether or not a function as a root node is provided. When the node information signal is received in step S91, the procedure proceeds to step S92, where the contents of the node information signal and a port having received the node information signal are correspondingly stored. When the node information signal is not received, the procedure directly proceeds to step S93. In step S93, it is determined whether or not the initialization process has been terminated. When it is terminated, the initialization process is completed, and when not, the procedure returns to step S91 for repeating the initialization process.

The operation of each communications node shown in FIGS. 4(a) through 4(e) will now be described correspondingly to the procedures shown in the flowcharts of FIGS. 5 through 10.

First, the operation of FIG. 4(b) is conducted as follows: The host of the node 0 generates a transfer request for the data D1 (YES in step S11), and the node 0 gains bus access permission and executes the data sending process S30. The node number of the destination is "1". The node 11 receives the data D1 (YES in step S16) and executes the data receiving process S40. Specifically, "1" is detected as the node number of the destination, the data D1 is repeated to the port connected with the node 1, and an NW signal NW is output to the other port (namely, the port connected with the node 10). The node 1 receives the data D1 (YES in step S16) and executes the data receiving process S40. The node 1 detects the node number of itself, namely, "1", as the node number of the destination (YES in step S41), and passes the received data D1 to its host.

Since the node 10 receives the NW signal NW at the root port (YES in step S19), the node 10 executes the local root node setting process S60. Since the node 10 itself does not have a function as a root node, the node 9 having the function as a root node is identified as a local root node candidate, to which a local root node setting signal LS is sent. Furthermore, the node 10 cancels the recognition as a root port of the port having received the NW signal and recognizes this port as a disable port (step S68), and recognizes the port having sent the local root node setting signal LS as a new root port (steps S63 through S66). Since the node 9 receives the local root node setting signal LS (YES in step S16), the node 9 executes the local root node setting signal receiving process S80. The node 9 sets the port having received this signal as a child port, and starts to work as the first local root node LRN1.

The operation of FIG. 4(c) is conducted as follows: The host of the node 3 generates a transfer request for the data D2 (YES in step S11), gains bus access permission and executes the data sending process S30. The node number of the destination is "7". The node 8 receives the data D2 (YES in step S16) and executes the data receiving process S40. Specifically, "7" is detected as the node number of the destination, and hence, the data D2 is repeated to the port connected with the node 7 and an NW signal NW is output to the other ports (namely, the ports connected with the nodes 6 and 10). The node 7 receives the data D2 (YES in step S16) and executes the data receiving process S40. The node 7 detects the node number of itself, namely, "7", as the node number of the destination (YES in step S41), and passes the received data D2 to its host.

Since the node 6 receives the NW signal NW at the root port (YES in step S19), the node 6 executes the local root node setting process S60. Since the node 6 itself has a function as a root node, the node 6 itself starts to work as the second local root node LRN2. Since the node 10 receives the NW signal NW at the child port, the node 10 repeats the NW signal NW to the node 9 corresponding to the root node (steps S20 and S21).

The operation of FIG. 4(d) is conducted as follows: When the node 0 stops sending the data D1, the node 11 completes the data receiving process S40 so as to stop repeating the data D1 and outputting the NW signal NW (step S18). Since the receipt of the NW signal NW at the disable port is terminated (YES in step S22), the node 10 executes the local root node canceling process S70. Since the node 10 itself is not a local root node (NO in step S71), the node 10 sends a local root node canceling signal LR to the node 9 corresponding to the first local root node LRN1. The node 10 switches the root port, with the port connected with the node 11 returned to a root port. Therefore, the NW signal NW received at the child port is repeated as an RNW signal to the node 11 instead of the node 9.

The operation of FIG. 4(e) is conducted as follows: When the node 3 stops sending the data D2, the node 8 completes the data receiving process S40 so as to stop repeating the data D2 and outputting the NW signal NW (step S18). Since the receipt of the NW signal NW at the disable port is terminated (YES in step S22), the node 6 executes the local root node canceling process S70. Since the node 6 itself is the second local root node LRN2 (YES in step S72), the node 6 terminates working as a local root node.

Figure 13:
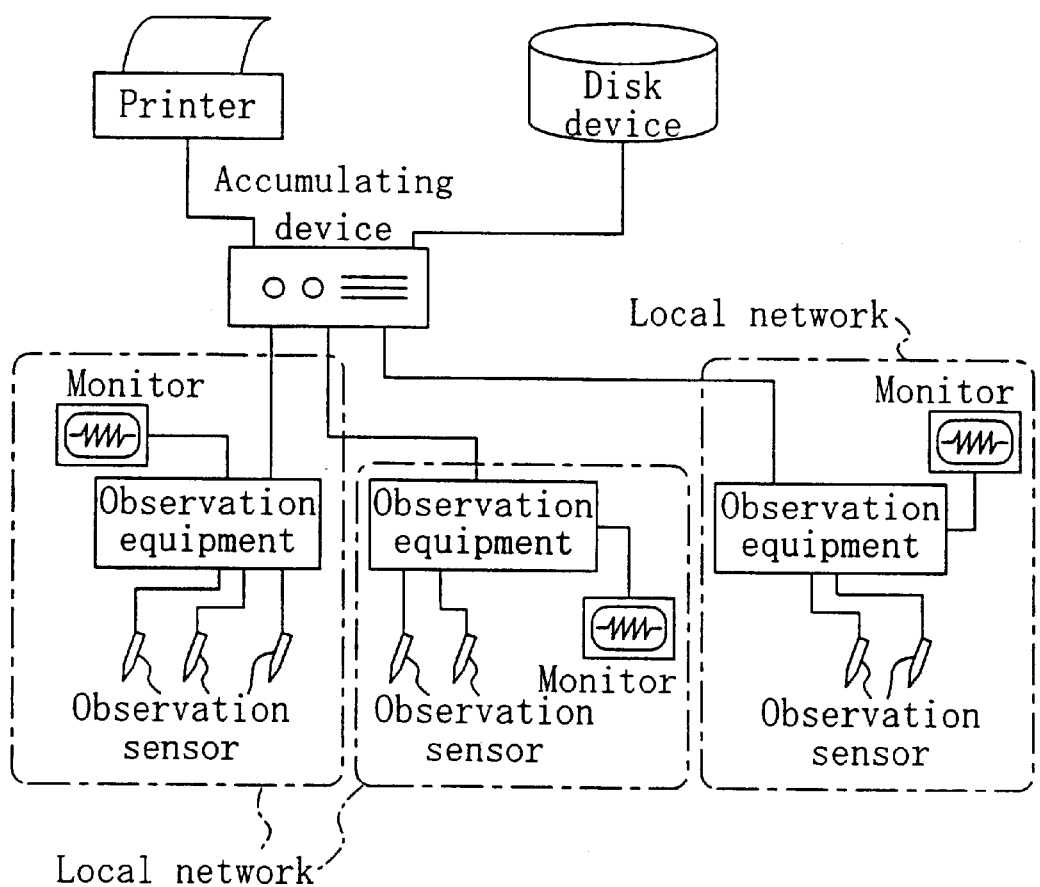
FIG. 13 is a diagram for showing a specific application of the invention.

FIG. 13 is a diagram of a network system exemplified as specific application of the present invention. The invention can exhibit remarkable effects in a network system as is shown in FIG. 13 including plurality local networks with high frequency of data transfer.

In FIG. 13, respective observation sensors observe data, such as a pressure, a temperature and a sound volume, and successively transfer results of the observation to observation equipment connected thereto. Each observation equipment transfers the received observation result to an output device such as a monitor. Each observation equipment also transfers data to an accumulating device at predetermined time intervals, and the accumulating device accumulates and processes the received data and outputs the result to a hard disk drive or a printer. In this network system, most of the data transfer is conducted within the respective local networks each including the observation sensors, the observation equipment and the monitor. Therefore, it is effective to execute the data transfer in the respective local network in parallel.

Accordingly, communications nodes included in the respective components of the network are set so as to conduct the operation according to the invention. In this manner, the respective components do not have to conduct unnecessary data transfer not related to themselves, and each observation equipment can be intent on data communications with the observation sensors and the monitor. As a result, the data transfer can be executed in parallel in the respective local networks.

The network system as is shown in FIG. 13 is applicable to, for example, an automobile by using a distance sensor or a contact sensor as the observation sensor and replacing the accumulating device with a device operated in emergency.

In this manner, the present invention can exhibit remarkable effects, such as improved transfer efficiency in a limited bandwidth and power saving, in a network system in which plural networks each including devices for sending and receiving specific data are combined to be comprehensively controlled.

Figure 14:
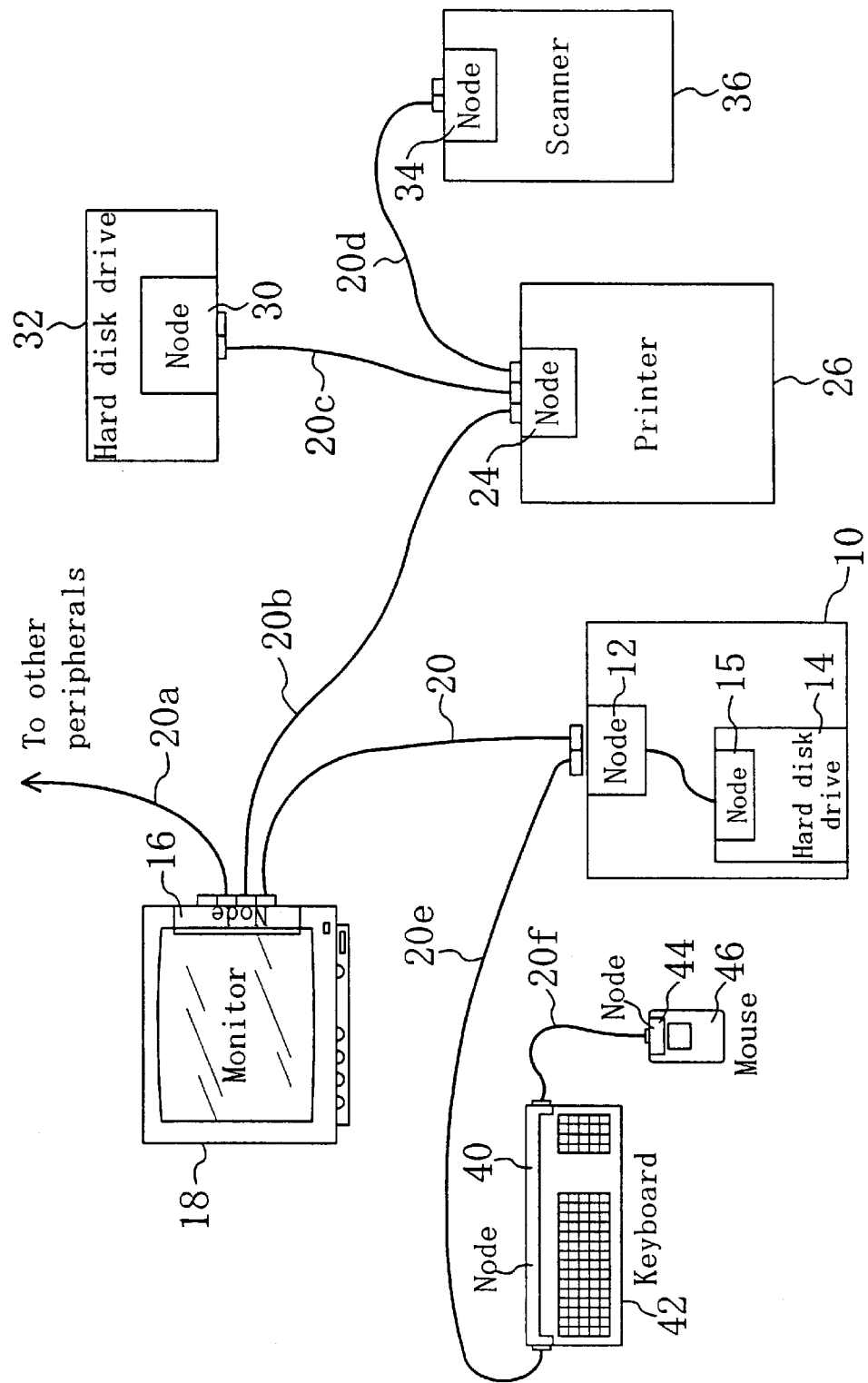
FIG. 14 is a diagram for showing an example of a computer environment utilizing the communications node according to the invention.

FIG. 14 is a diagram for showing an example of the computer environment utilizing the communications node according to the invention. In FIG. 14, a CPU 10 has a communications node 12, which is connected with a communications node 15 included in an internal hard disk drive 14. Also, a cable 20 connects the communications node 12 of the CPU 10 with a communications node 16 included in a monitor 18. Similarly, a cable 20a connects the communications node 16 of the monitor 18 with other peripheral equipment, and a cable 20b connects the communications node 16 of the monitor 18 with a communications node 24 included in a printer 26. The communications node 24 of the printer 26 is connected with a communications node 30 included in a hard disk drive 32 through a cable 20c and with a communications node 34 included in a scanner 36 through a cable 20d. The communications node 12 of the CPU 10 is also connected with a communications node 40 of a keyboard 42 through a cable 20e, and the communications node 40 of the keyboard 42 is connected with a communications node 44 of a mouse 46 through a cable 20f.

Each of the communications nodes is connected with a device functioning as a local host. For example, the CPU 10 corresponds to the local host of the communications node 12 and the monitor 18 corresponds to the local host of the communications node 16.

Figure 15:
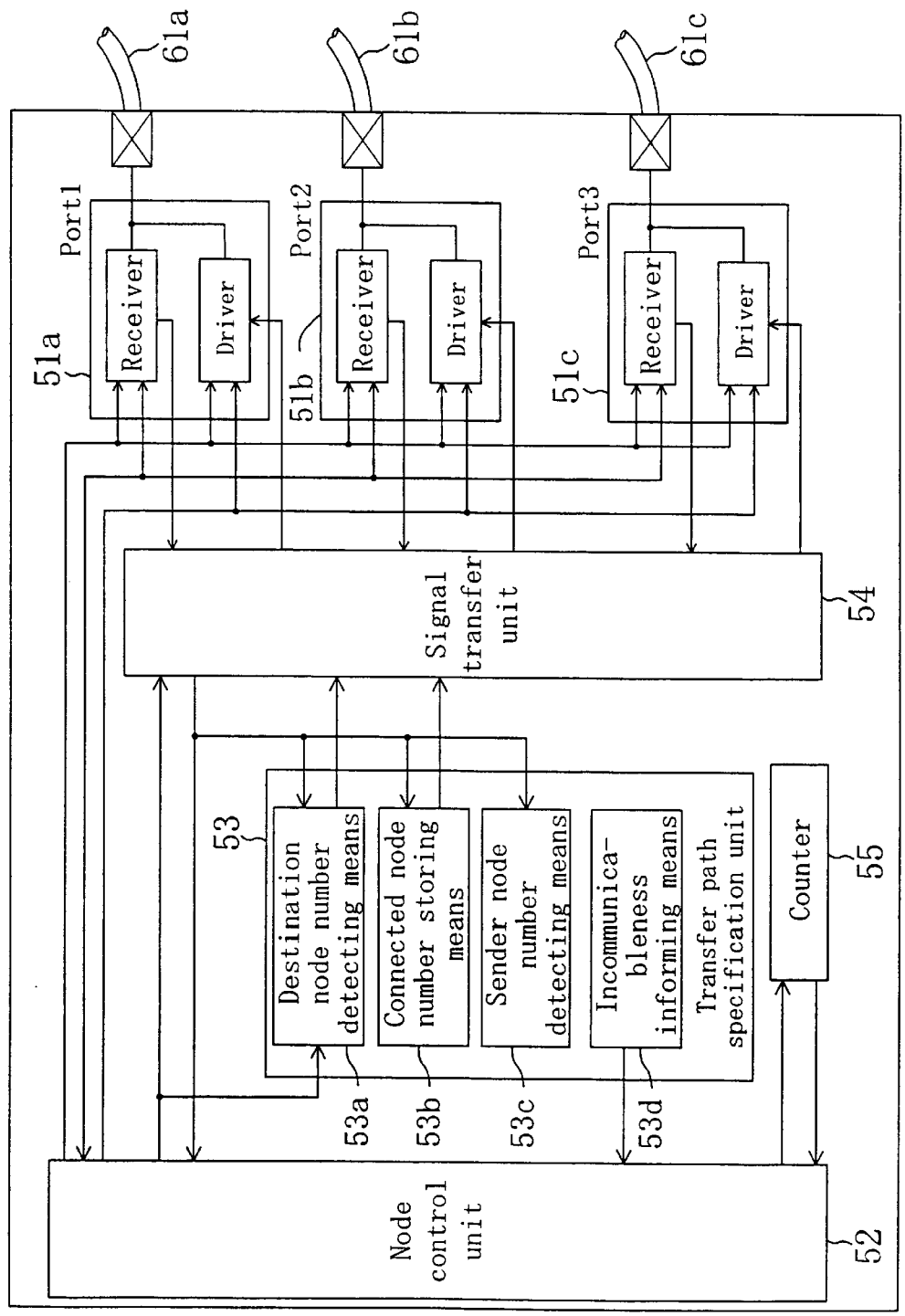
FIG. 15 is a diagram for showing an example of the internal configuration of the communication node.
Figure 16:
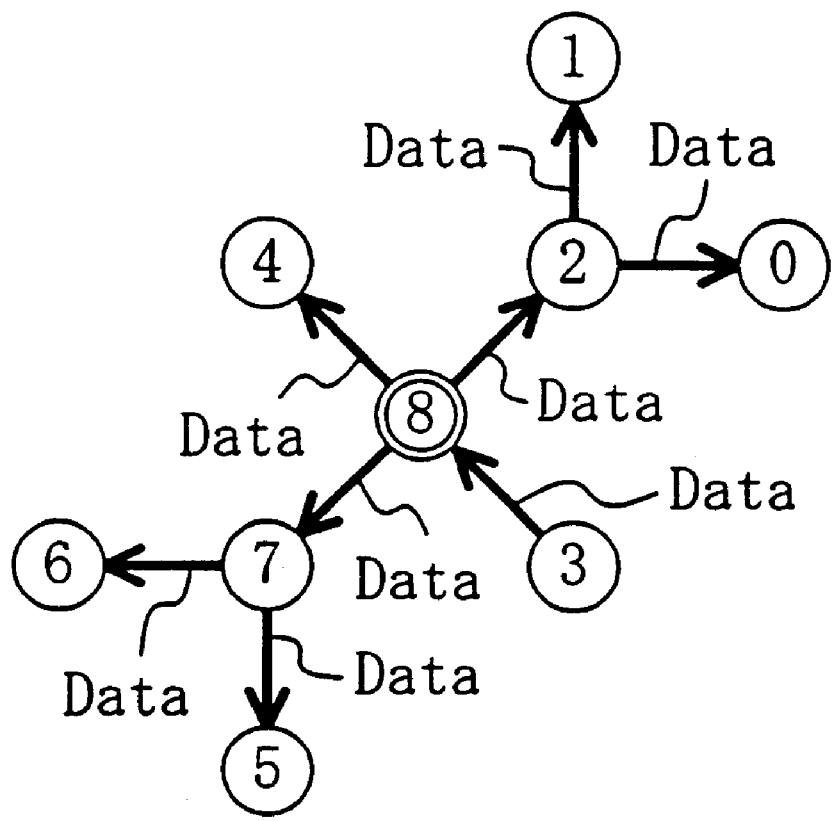
FIG. 16 is a diagram for showing data transfer between communications nodes in a conventional network.

FIG. 15 shows an example of the internal configuration of the communications node. In FIG. 15, ports 51a, 51b and 51c are connected with other communications nodes respectively through cables 61a, 61b and 61c for sending/receiving signals, and a node control unit 52 decodes an instruction from a host and a signal input through the port so as to conduct a process in accordance with a predetermined protocol. Furthermore, a transfer path specification unit 53 specifies a transfer path of a signal, and includes means 53a for detecting a node number of the destination of a received signal, means 53b for storing the node numbers of communications nodes connected with the respective ports, means 53c for detecting the node number of a sender of a received signal, and means 53d for generating a signal indicating that a received signal is untransferable. A signal transfer unit 54 transfers a signal to a signal transfer path specified by the transfer path specification unit 53.

In this manner, according to the invention, a range of data transfer within a network can be suppressed to a necessary minimum and data is never transferred to a communications node not concerned in the data transfer. Accordingly, each communications node can be prevented from postponing its own processing due to unnecessary data receipt and repeat. Furthermore, since communications nodes not concerned in the data transfer can form a local network where a data can be independently transferred, plural data transfer can be executed in parallel in point of time. As a result, the bus use efficiency can be improved in data transfer and power consumption can be reduced by avoiding receiving and repeating unnecessary data.

What is claimed is:

1. A communications node included in a network system, comprising:

a plurality of ports;

means for repeating, in receiving a data, said received data to a port among said ports capable of data transfer to a destination communications node of said data; and means for outputting, in receiving said data, to other ports thereof, an NW (now working) signal indicating that a data is being transferred, wherein, in receiving an NW signal at a root port thereof, said communications node operates to form a local network capable of independent data transfer therein together with other communications nodes to which data is transferable from the ports thereof other than said root port.

2. The communications node of claim 1, wherein, in receiving said NW signal at said root port, if said communications node has a function as a root node, said communications node starts to operate as a local root node for controlling arbitration in said local network, and if said communications node does not have a function as a root node, said communications node sends a local root node setting signal for directing any of said other communications nodes to operate as a local root node.

3. The communications node of claim 2, wherein when said communications node sends said local root node setting signal, said communications node cancels recognition of said original root port having received said NW signal and recognizes a port having sent said local root node setting signal as a new root port.

4. The communications node of claim 3, wherein, when receipt of said NW signal at said original root port is terminated, if said communications node is a local root node, said communications node stops operating as said local root node, and if said communications node is not a local root node, said communications node sends a local root node canceling signal for directing another communications node operating as a local root node to stop operating as said local root node.

5. The communications node of claim 1, wherein, in initialization of said network system, said communications node sends information on said communications node from said ports capable of data transfer, and said communications node stores information on said other communications nodes received at said ports capable of data transfer.

6. The communications node of claim 5, wherein said communications node identifies a port for sending a data by comparing a node number of the destination communications node of said data with node numbers of other communications nodes to which data is transferable from the respective ports thereof included in the information stored in the initialization of the network.

7. The communications node of claim 1, wherein, in receiving a data, when a port capable of data transfer to the destination communications node of said data is not in a transferable state, said communications node sends a signal indicating that said data is untransferable to a port capable of data transfer to a sender communication node of said data.

8. The communications node of claim 1, wherein said communications node has a function to specify a broadcast communication time.

9. The communications node of claim 1, wherein when an NW signal or an RNW signal corresponding to a repeated NW signal is received at a port other than said root port, said communications node repeats the RNW signal to said root port, a signal is not received at a port sending an NW signal, and a signal received at another port is repeatable to a port sending or receiving an RNW signal, and when an arbitration signal is received at a port sending an RNW signal, the communications node terminates sending the RNW signal.

10. A network system comprising a plurality of communications nodes of claim 1 connected through buses.

11. A method of controlling a network system including a plurality of communications nodes connected through buses, comprising the steps of:

specifying a data transfer path in sending a data from one communications node to another communications node; and forming a local network capable of independent data transfer therein by communications nodes not belonging to said data transfer path.

12. The method of controlling a network system of claim 11, further comprising:

a step of setting one communications node belonging to said local network as a local root node for mediating arbitration in said local network.

\* \* \* \* \*